United States Patent
Li (10) Patent No.: US 9,154,522 B2
(45) Date of Patent: Oct. 6, 2015

(54) NETWORK SECURITY IDENTIFICATION METHOD, SECURITY DETECTION SERVER, AND CLIENT AND SYSTEM THEREFOR

(71) Applicant: Yonghua Li, Shenzhen (CN)

(72) Inventor: Yonghua Li, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/350,952

(22) PCT Filed: Sep. 20, 2012

(86) PCT No.: PCT/CN2012/081636
§ 371 (c)(1),
(2) Date: Apr. 10, 2014

(87) PCT Pub. No.: WO2013/053278
PCT Pub. Date: Apr. 18, 2013

(65) Prior Publication Data
US 2014/0259100 A1 Sep. 11, 2014

(30) Foreign Application Priority Data
Oct. 14, 2011 (CN) .......................... 2011 1 0311462

(51) Int. Cl.
*H04L 29/06* (2006.01)
*H04L 29/08* (2006.01)

(52) U.S. Cl.
CPC ............ *H04L 63/20* (2013.01); *H04L 63/0236* (2013.01); *H04L 63/0245* (2013.01); *H04L 63/164* (2013.01); *H04L 67/2842* (2013.01); *H04L 63/168* (2013.01)

(58) Field of Classification Search
CPC ... H04L 63/20; H04L 63/164; H04L 63/0245; H04L 63/0236
USPC ...................................................... 726/1–242
See application file for complete search history.

(56) References Cited

U.S. PATENT DOCUMENTS 7,467,206 B2 * 12/2008 Moore et al. ................... 709/225
7,818,343 B1 * 10/2010 Sekhar et al. .................. 707/781
(Continued)

FOREIGN PATENT DOCUMENTS

CN 101447006 6/2009
CN 101582887 A * 10/2009 .............. H04L 29/06
(Continued)

*Primary Examiner* — Hadi Armouche
*Assistant Examiner* — Sher Khan
(74) *Attorney, Agent, or Firm* — Dilworth & Barrese, LLP (57) ABSTRACT

There are provided a network security identification method, a client and system therefore. The method includes: prior to accessing network content corresponding to a uniform resource locator, judging, by a client, whether a cache stores a security state of the uniform resource locator; if the cache stores the security state of the uniform resource locator, acquiring, by the client, the security state of the uniform resource locator from the cache; if the cache does not store the security state of the uniform resource locator, sending, by the client, a request for accessing the network content corresponding to the uniform resource locator to a security detection server, and receiving the security state of the uniform resource locator returned by the security detection server; and determining, by the client according to the security state of the uniform resource locator, whether to access the network content corresponding to the uniform resource locator.

5 Claims, 5 Drawing Sheets

(56) References Cited

U.S. PATENT DOCUMENTS

| | | | |
|---|---|---|---|
| 8,856,545 B2* | 10/2014 | Banerjee et al. | 713/188 |
| 8,903,941 B1* | 12/2014 | Kaul | 709/217 |
| 2008/0082662 A1* | 4/2008 | Dandliker et al. | 709/225 |
| 2010/0269168 A1* | 10/2010 | Hegli et al. | 726/11 |
| 2011/0314152 A1* | 12/2011 | Loder | 709/225 |

FOREIGN PATENT DOCUMENTS

| | | | |
|---|---|---|---|
| CN | 101582887 | 11/2009 | |
| CN | 101582887 A * | 11/2009 | H04L 29/06 |
| CN | 101854335 | 10/2010 | |
| CN | 101854335 A * | 10/2010 | H04L 63/0236 |
| WO | 2011/018316 | 2/2011 | |

* cited by examiner

| URL | Category |
|---|---|
| http://example2.com/abc | Malicious |
| http://example2.biz/abc | Secure |
| http://example3.com/abc | Spyware |
| ...... | ...... |

FIG. 10

| URL |
|---|
| http://example4.com/abc |
| http://example5.com/abc |
| http://example6.biz/abc |
| ...... |

NETWORK SECURITY IDENTIFICATION METHOD, SECURITY DETECTION SERVER, AND CLIENT AND SYSTEM THEREFOR

REFERENCE TO PRIOR APPLICATIONS

This application claims priority to Chinese Patent Application No. 201110311462.1, filed before the Chinese Patent Office on Oct. 14, 2011 and entitled "NETWORK SECURITY IDENTIFICATION METHOD, SECURITY DETECTION SERVER, AND CLIENT AND SYSTEM THEREFOR", which is incorporated herein by reference in its entirety.

TECHNICAL FIELD

The present disclosure relates to the field of information security, and in particular, to a network security identification method, and a device and system therefor.

BACKGROUND

With the development of Internet technologies, more and more content is transmitted and accessed over the Internet. Currently, the browser/server (B/S) application mode is typically employed to transmit and access content over the Internet. Specifically, the content is stored on a Web server, a Hypertext transfer Protocol (HTTP)-based platform, in the form of files, and transferred to a client using HTTP. After being processed by a client browser, the content is displayed on the client.

However, endless viruses and Trojan horses deteriorate security of the transmission and access of the content over the Internet, resulting in economic and mental losses. A commonly used solution to such problems is that the client identifies viruses and Trojan horses hidden in the content during transmission by using such installed software as virus library and firewall.

Nevertheless, the software such as virus library and firewall installed on the client increases load of the client, and increases costs and workload for maintaining and upgrading such software. Especially, such problem becomes severe with respect to a client having limited storage capacity and event processing capability, for example, mobile phones.

SUMMARY

To address the above technical problem, embodiments of the present disclosure provide a network security identification method, a security detection server, and a client and system therefor. The technical solutions are as follows:

A network security identification method includes:
receiving, by a security detection server, from a client a request for accessing network content corresponding to a uniform resource locator (URL);
searching, by the security detection server, in a database, and judging whether a security state of the uniform resource locator exists in the database;
when the security state of the uniform resource locator does not exist in the database, collecting, by the security detection server, data related to the uniform resource locator, and determining the security state of the uniform resource locator according to the collected data; and
returning, by the security detection server, the security state of the uniform resource locator to the client, such that the client determines, according to the security state of the uniform resource locator, whether to access the network content corresponding to the uniform resource locator.

A security detection server includes: a receiving module, a database, a searching and judging module, a determining module, and a returning module.

the receiving module is configured to receive from a client a request for accessing network content corresponding to a uniform resource locator;
the database is configured to store a mapping relationship between uniform resource locators and security states;
the searching and judging module is configured to search in the database, and judge whether a security state of the uniform resource locator exists in the database;
the determining module is configured to: when the searching and judging module judges that the security state of the uniform resource locator does not exist in the database, collect data related to the uniform resource locator, and determine the security state of the uniform resource locator according to the collected data; and
the returning module is configured to return the security state of the uniform resource locator to the client, such that the client determines, according to the security state of the uniform resource locator, whether to access the network content corresponding to the uniform resource locator.

A network security identification method includes:
prior to accessing network content corresponding to a uniform resource locator, judging, by a client, whether a cache stores a security state of the uniform resource locator;
if the cache stores the security state of the uniform resource locator, acquiring, by the client, the security state of the uniform resource locator from the cache;
if the cache does not store the security state of the uniform resource locator, sending, by the client, a request for accessing the network content corresponding to the uniform resource locator to a security detection server, and receiving the security state of the uniform resource locator returned by the security detection server, and
determining, by the client according to the security state of the uniform resource locator, whether to access the network content corresponding to the uniform resource locator.

A client includes: a judging module, a first acquiring module, a second acquiring module, and a decision making module.

The judging module is configured to: prior to accessing network content corresponding to a uniform resource locator, judge whether a cache stores a security state of the uniform resource locator.

The first acquiring module is configured to: if the cache stores the security state of the uniform resource locator, acquire the security state of the uniform resource locator from the cache.

The second acquiring module is configured to: if the cache does not store the security state of the uniform resource locator, send a request for accessing the network content corresponding to the uniform resource locator to a security detection server, and receive the security state of the uniform resource locator returned by the security detection server.

The decision making module is configured to determine, according to the security state of the uniform resource locator, whether to access the network content corresponding to the uniform resource locator.

A network security identification system includes: a client and a security detection server.

The client is configured to: prior to accessing network content corresponding to a uniform resource locator, judge whether a cache stores a security state of the uniform resource locator; acquire the security state of the uniform resource locator from the cache if the cache stores the security state of the uniform resource locator; and send a request for accessing the network content corresponding to the uniform resource locator to a security detection server if the cache does not store the security state of the uniform resource locator.

The security detection server is configured to: receive from a client a request for accessing network content corresponding to a uniform resource locator, search in the database, and judge whether a security state of the uniform resource locator exists in the database: when the security state of the uniform resource locator does not exist in the database, collect data related to the uniform resource locator, and determine the security state of the uniform resource locator according to the collected data; and return the security state of the uniform resource locator to the client.

The client is configured to receive the security state of the uniform resource locator returned by the security detection server, and determine, according to the security state of the uniform resource locator, whether to access the network content corresponding to the uniform resource locator.

With the above-described technical solutions according to the embodiments of the present disclosure, a client is capable of knowing whether network content corresponding to a uniform resource locator is secure simply according to a security state of the uniform resource locator, thereby reducing load of the client. The client determines, according to the determined security state of the uniform resource locator, whether to continue accessing the network or cancel the access, thereby ensuring security of the client.

DETAILED DESCRIPTION

To make the technical solutions and advantages of the present disclosure clearer, the embodiments of the present disclosure are described in detail below with reference to the accompanying drawings.

Figure 1A:
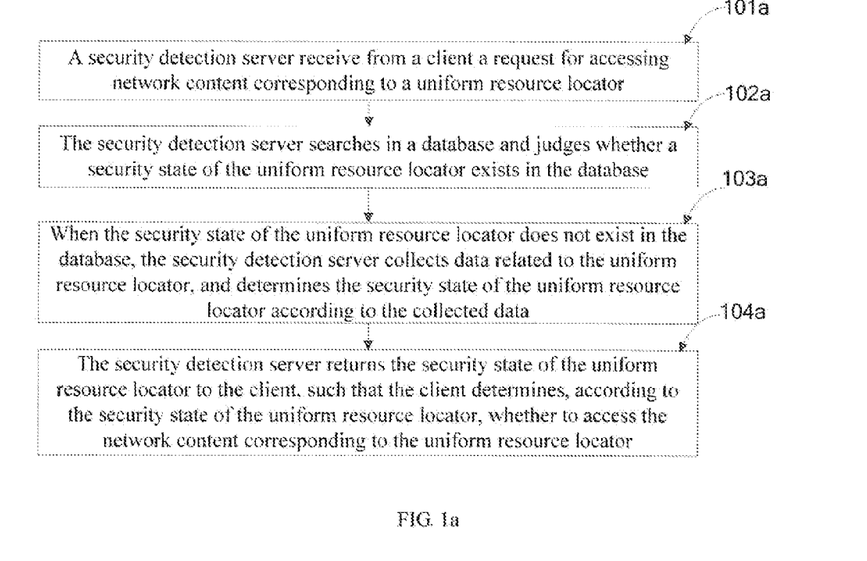
FIG. 1a is a flowchart of a network security identification method according to an embodiment of the present disclosure.

Referring to FIG. 1a, a network security identification method includes the following steps:

Step 101a: A security detection server receives from a client a request for accessing network content corresponding to a uniform resource locator.

Step 102a: The security detection server searches in a database, and judge whether a security state of the uniform resource locator exists in the database.

Step 103a: When the security state of the uniform resource locator does not exist in the database, the security detection server collects data related to the uniform resource locator, and determines the security state of the uniform resource locator according to the collected data.

Step 104a: The security detection server returns the security state of the uniform resource locator to the client, such that the client determines, according to the security state of the uniform resource locator, whether to access the network content corresponding to the uniform resource locator.

Figure 1B:
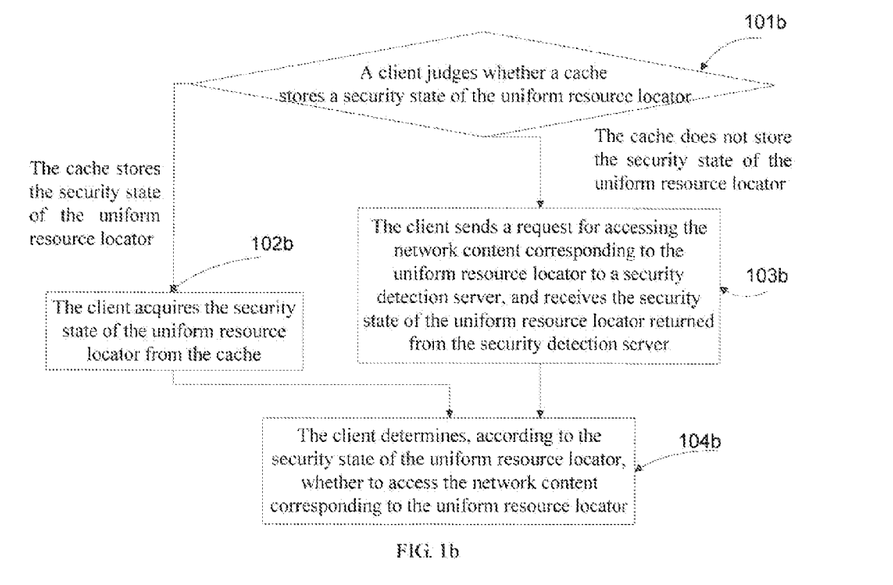
FIG. 1b is a flowchart of a network security identification method according to an embodiment of the present disclosure.

Referring to FIG. 1b, a network security identification method includes the following steps:

Step 101b: A client, prior to accessing network content corresponding to a uniform resource locator, judges whether a cache stores a security state of the uniform resource locator.

If the cache stores the security state of the uniform resource locator, step 102b is performed.

If the cache does not store the security state of the uniform resource locator, step 103b is performed.

Step 102b: The client acquires the security state of the uniform resource locator from the cache, and step 104b is performed.

Step 103b: The client sends a request for accessing the network content corresponding to the uniform resource locator to a security detection server, and receives the security state of the uniform resource locator returned from the security detection server.

Step 104b: The client determines, according to the security state of the uniform resource locator, whether to access the network content corresponding to the uniform resource locator.

With the above-described technical solutions according to the embodiments of the present disclosure, a client is capable of knowing whether network content corresponding to a uniform resource locator is secure simply according to a security state of the uniform resource locator, thereby reducing load of the client. The client determines, according to the determined security state of the resource locator, whether to continue accessing the network or cancel the access, thereby ensuring security of the client.

Figure 2:
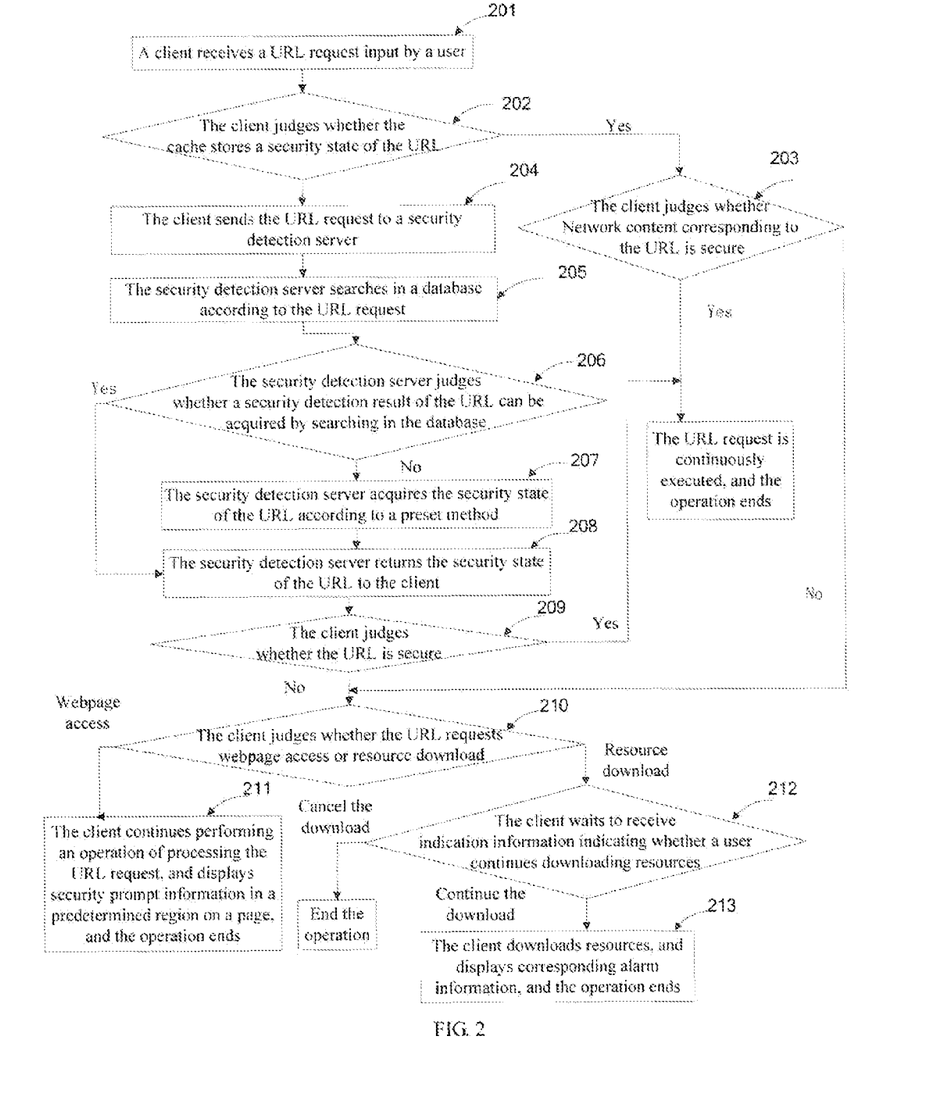
FIG. 2 is a flowchart of a network security identification method according to an embodiment of the present disclosure.

Based on the above systematic description, this embodiment of the present disclosure provides a network security identification method. Security of network content is identified by a security detection server. Referring to FIG. 2, the method specifically includes the following steps:

Step 201: A client receives a URL request input by a user, to acquire network content corresponding to the URL request using the URL request.

Step 202: The client reads a cache, and judges whether the cache stores a security state of the URL.

If the cache stores a security state of the URL, step 203 is performed.

If the cache does not store a security state of the URL, step 204 is performed.

Herein, to improve the speed of accessing the network content corresponding to the URL, the client stores accessed URLs and security states thereof in a memory of the client. In this case, the occupied memory is referred to as the cache. When the client accesses the network content again, a client browser firstly searches in the memory cache; if the security state of a URL to be accessed has been stored in the cache, it is unnecessary for the client to acquire the security state from the security detection server, instead the client can directly acquire the security state from the cache. In this way, the speed of accessing the network content is improved.

Step 203: The client acquires the security state of the URL from the cache, and judges, according to the security state, whether network content corresponding to the URL is secure.

If secure, the URL request is continuously executed, and the operation ends.

If insecure, step 210 is performed.

It should be noted that steps 202 and 203 are optional steps.

Step 204: The client sends the URL request to a security detection server.

Step 205: The security detection server searches in a database according to the URL request, where the database is specifically a categorized URL database and stores URLs and security states thereof.

It should be noted that the security detection server may create the database in the following manners, where the database is a categorized URL database:

Manner 1: Collecting statistics for security states of the URLs fed back by the client, and writing the security states that are fed back into a categorized URL database.

After successfully accessing the network content corresponding to the URL, the client determines the security state of the URL, and feeds back the security state of the URL to the security detection server, such that the security detection server determines a final security state of the URL according to the security state that is fed back by the client.

For example, the client opens a webpage corresponding to the URL (which should be a webpage for downloading a video resource). However, a game page is finally displayed on the client. In this case, the client considers that the network content corresponding to the URL is implanted with a malicious plug-in, and the network content is insecure, and feeds back the security state of the URL to the security detection server, such that the security detection server collects statistics therefore.

Manner 2: Downloading page data corresponding to the URL from a network server, the process of which may be specifically implemented by using an installed software program, routine program, or process etc. used for downloading the page data corresponding to the URL:

Searching URL page source data and scanning the source data to search in the page source data for a specific keyword indicative of the type of the network content, determining, according to the type of the keyword, a security state of the network content corresponding to the URL, and writing the security state into a categorized URL database.

For example, if the URL page source data acquired by scanning includes "javascript://", the URL page may be identified as using Java scripts. Although the content is not inherently insecure, there is a high probability that a webpage using Java scripts contains malicious content.

Manner 3: Downloading page data corresponding to the URL from a network server, the process of which may be specifically implemented by using an installed software program, routine program, or process for downloading the page data corresponding to the URL:

Matching the URL page data with a virus feature in an installed virus library, determining a security state of the network content corresponding to the URL according to a match result, and writing the security state into a categorized URL database.

For example, the URL page data may be matched with a domain associated with a known malicious IP address by comparison. When the URL page data is matched with the malicious IP address, the URL page data is insecure; otherwise, the URL page data is secure.

Step 206: The security detection server judges whether a security detection result of the URL can be acquired by searching in the database.

If a security detection result of the URL cannot be acquired, step 207 is performed.

If a security detection result of the URL can be acquired, step 208 is performed.

Step 207: The security detection server acquires the security state of the URL according to a preset method. Specifically, the security state of the URL is acquired by using Manner 2 or Manner 3 described in step 205.

Step 208: The security detection server returns the security state of the URL to the client.

Step 209: The client caches the received security state of the URL, and judges whether the URL is secure according to the received security state of the URL.

If insecure, step 210 is performed.

If secure, the URL request is continuously executed, and the operation ends.

Step 210: The client judges whether the URL requests webpage access or resource download.

If webpage access is requested, step 211 is performed.

If resource download is requested, step 212 is performed.

Step 211: The client continues performing an operation of processing the URL request, and displays security prompt information in a predetermined region on a page, and the operation ends.

Step 212: The client displays the security prompt information for resource download, and waits to receive indication information indicating whether a user continues downloading resources.

When indication information input by the user for continuing downloading resources is received, step 213 is performed.

When indication information input by the user for canceling resource download is received, the operation ends.

Step 213: The client downloads resources, and displays corresponding alarm information, and the operation ends.

Through information interaction between the client and the security detection server, the client acquires the security state of network content to be accessed simply by performing some simple read and judge operations, mitigating load of the client. The client determines, according to the acquired security state of the network content to be accessed, whether to continue accessing the network content or cancel the access, thereby ensuring security of the client.

Figure 3:
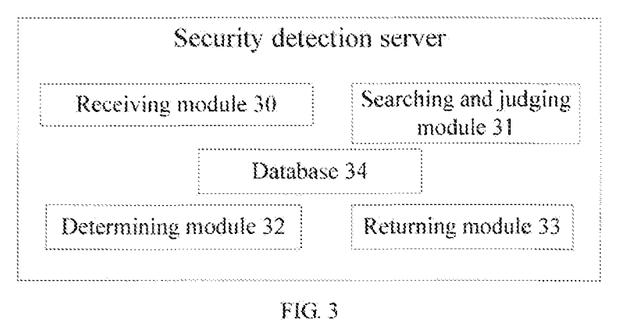
FIG. 3 schematically illustrates a security detection server according to an embodiment of the present disclosure.

Referring to FIG. 3, a security detection server is provided. The security detection server, specifically the same as the security detection server described in Embodiment 2, includes: a receiving module 30, a database 34, a searching and judging module 31, a determining module 32, and a returning module 33.

The receiving module 30 is configured to receive from a client a request for accessing network content corresponding to a uniform resource locator.

The database 34 is configured to store a mapping relationship between uniform resource locators and security states.

The searching and judging module 31 is configured to search in the database, and judge whether a security state of the uniform resource locator exists in the database.

The determining module 32 is configured to: when the searching and judging module 31 judges that the security state of the uniform resource locator does not exist in the database, collect data related to the uniform resource locator, and determine the security state of the uniform resource locator according to the collected data.

The returning module 33 is configured to return the security state of the uniform resource locator to the client, such that the client determines, according to the security state of the uniform resource locator, whether to access the network content corresponding to the uniform resource locator.

Specifically, the searching and judging module 31 includes:

a collecting unit, configured to download the network content corresponding to the uniform resource locator from a network server;

a searching unit, configured to search in the network content for a specific keyword indicative of the type of the network content; and a first determining unit, configured to determine the security state of the uniform resource locator according to the specific keyword.

The searching and judging module 31 may further include:

a collecting unit, configured to download the network content corresponding to the uniform resource locator from a network server;

a matching unit, configured to match the network content with a virus feature in an installed virus library; and a second determining unit, configured to determine the security state of the uniform resource locator according to a match result.

It should be noted that the security detection server further includes:

a first creating module, configured to pre-create the database, and write the security state of the uniform resource locator returned by the client into the database; or a second creating module, configured to: pre-create the database; download the network content corresponding to the uniform resource locator from a network server; search in the network content for a specific keyword indicative of the type of the network content; determine the security state of the uniform resource locator according to the specific keyword, and write the security state of the uniform resource locator into the database; or a third creating module configured to: pre-create the database; download the network content corresponding to the uniform resource locator from a network server; match the network content with a virus feature in an installed virus library; determine the security state of the uniform resource locator according to a match result; and write the security state of the uniform resource locator into the database.

Figure 4:
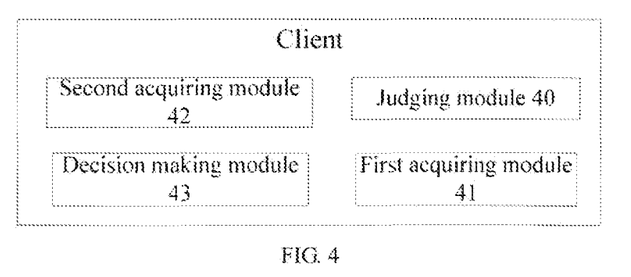
FIG. 4 schematically illustrates a client according to an embodiment of the present disclosure.

Referring to FIG. 4, a client is provided. The client, specifically the same as the client described in Embodiment 2, includes: a judging module 40, a first acquiring module 41, a second acquiring module 42, and a decision making module 43.

The judging module 40 is configured to: prior to accessing network content corresponding to a uniform resource locator, judge whether a cache stores a security state of the uniform resource locator.

The first acquiring module 41 is configured to: if the cache stores the security state of the uniform resource locator, acquire the security state of the uniform resource locator from the cache.

The second acquiring module 42 is configured to: if the cache does not store the security state of the uniform resource locator, send a request for accessing the network content corresponding to the uniform resource locator to a security detection server, and receive the security state of the uniform resource locator returned by the security detection server.

The decision making module 43 is configured to determine, according to the security state of the uniform resource locator, whether to access the network content corresponding to the uniform resource locator.

The decision making module includes:

a judging unit, configured to judge, according to the security state of the uniform resource locator, whether the uniform resource locator is secure;

a first executing unit, configured to continue an operation of accessing the network content corresponding to the uniform resource locator if the first judging unit judges that the uniform resource locator is secure;

a second executing unit, configured to judge whether the uniform resource locator is for webpage access or resource download if the judging unit judges that the uniform resource locator is insecure;

a first processing unit, configured to display security prompt information on a predetermined region on a page if the second executing unit judges that the uniform resource locator is for webpage access; and a second processing unit, configured to: if the second executing unit judges that the uniform resource locator is for resource download, display security prompt information for resource download, wait to receive indication information indicating whether a user continues downloading resources, and download the resources and displaying the prompt information upon receiving the indication information input by the user for continuing downloading the resources.

During specific implementation of this embodiment, the client illustrated in FIG. 4 may further include:

a feedback module, configured to: upon accessing the network content corresponding to the uniform resource locator, determine the security state of the uniform resource locator, and feed back the security state of the uniform resource locator to the security detection server, such that the security detection server determines a final security state of the uniform resource locator according to the security state fed back by the client.

With the above-described technical solutions according to the embodiments of the present disclosure, a client is capable of knowing whether network content corresponding to a uniform resource locator is secure simply according to a security state of the returned uniform resource locator, thereby reducing load of the client. The client determines, according to the determined security state of the uniform resource locator, whether to continue accessing the network or cancel the access, thereby ensuring security of the client.

This embodiment provides a network content security identification system, where network content is acquired by using a uniform/universal resource locator (URL) request, and the network content includes executable secure content and malicious content. The secure content refers to any type of content for which an instruction can be executed by a network browser or a network client, for example, executable code of small programs, embedded HTML, or other hypertext documents (e.g., script languages of Java scripts or VB scripts), and executable code embedded into other documents (e.g., Microsoft Word Macro or Style sheet). The malicious content refers to content that is unexecutable but takes advantages of the weakness of the client through calculation, for example, interaction content in the "phishing" solution. In this solution, the interaction content is such designed as content provided by such a trusted website as banks, to tempts users to provide an unauthorized party with certificates or other sensitive information.

Figure 5:
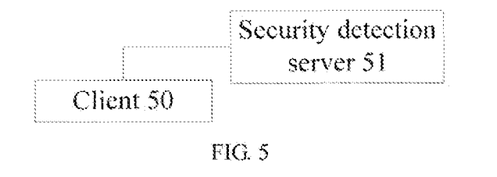
FIG. 5 schematically illustrates a network security identification system according to an embodiment of the present disclosure.

Referring to FIG. 5, a network security identification system includes: a client 50 and a security detection server 51.

The client 50 is configured to: prior to accessing network content corresponding to a uniform resource locator, judge whether a cache stores a security state of the uniform resource locator; acquire the security state of the uniform resource locator from the cache if the cache stores the security state of the uniform resource locator; and send a request for accessing the network content corresponding to the uniform resource locator to the security detection server 51 if the cache does not store the security state of the uniform resource locator.

The security detection server 51 is configured to: receive from the client 50 a request for accessing network content corresponding to a uniform resource locator; search in the database, and judge whether a security state of the uniform resource locator exists in the database; when the security state of the uniform resource locator does not exist in the database, collect data related to the uniform resource locator, and determine the security state of the uniform resource locator according to the collected data; and return the security state of the uniform resource locator to the client 50.

The client 50 is configured to receive the security state of the uniform resource locator returned by the security detection server 51, and determine, according to the security state of the uniform resource locator, whether to access the network content corresponding to the uniform resource locator.

Specifically, the structure of the client 50 is specifically the same as that of the client described in Embodiment 3 and is thus not described herein any further; the structure of the security detection server is the same as that of the security detection server described in Embodiment 3 and is thus not described herein any further.

With the above-described technical solutions according to the embodiments of the present disclosure, a client is capable of knowing whether network content corresponding to a uniform resource locator is secure simply according to a security state of the uniform resource locator, thereby reducing load of the client. The client determines, according to the determined security state of the resource locator, whether to continue accessing the network or cancel the access, thereby ensuring security of the client.

Figure 6:
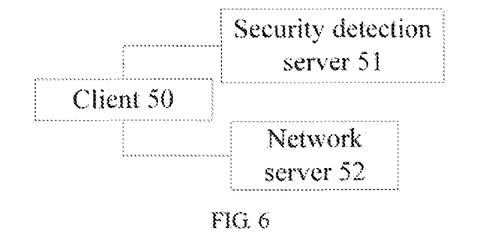
FIG. 6 schematically illustrates a network security identification system according to an embodiment of the present disclosure.

Referring to FIG. 6, a network security identification system according to an embodiment of the present disclosure may further include a network server 52, in addition to the client 50 and the security detection server 51. The client 50 may be various types of client connected to the network, for example, a mobile phone, a palm computer, a desktop computer, and a personal digital assistant (PDA). The client 50 may also be installed with an operating system, where the operating system allows the client 50 to implement two-way communication with the network by using such software program modules as network browser and email. The client 50 may also connected to the security detection server 51, such that the URL request sent to the network passes through the security detection server 51 during the process of entering the network. The security detection server 51 may also be connected to the network server 52 to implement identification and classification of the network content downloaded to the client 50 over the network. The client 50 may also be connected to the network server 52 to implement two-way communication with the network server 52, such that the client 50 is capable of uploading data to the network server 52 or downloading data from the network server 52. The network server 52 may be specifically a Web/WAP server.

Figure 7:
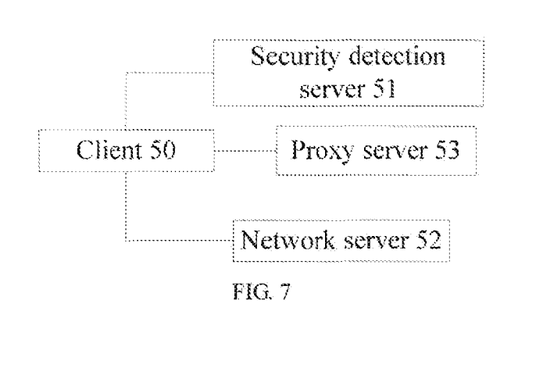
FIG. 7 schematically illustrates a network security identification system according to an embodiment of the present disclosure.

Referring to FIG. 7, a network security identification system according to an embodiment of the present disclosure may further include: a proxy server 53, in addition to a client 50, a security detection server 51 and a network server 52. In the system illustrated in FIG. 7, the proxy server 53 is added based on the system illustrated in FIG. 2. The proxy server 53 is connected to the client 50, the security detection server 51, and the network server 52 respectively, and communicates therewith. The client 50 transfers some complicated applications to the proxy server 53 to implement, thereby mitigating load of the client. The proxy server 53 greatly relieves load of clients having smaller storage and calculation capabilities, for example, mobile phones, and expands functions of such clients as mobile phones. Application programs to be run by the proxy server 53 are run under remote control of the client 50.

Figure 8:
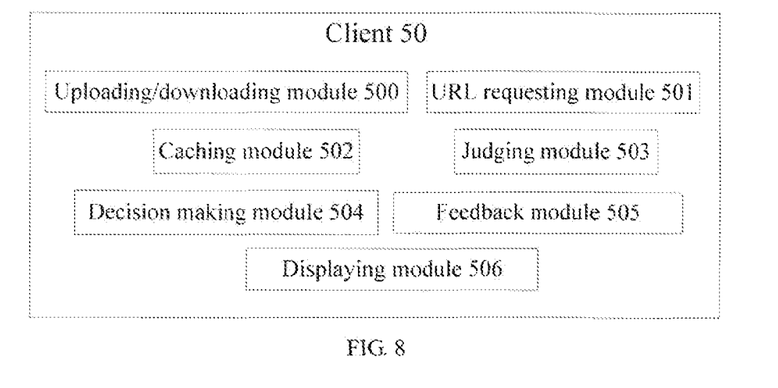
FIG. 8 is a structural block diagram of a client according to an embodiment of the present disclosure.

Referring to FIG. 8, a more detailed structural block diagram of the client 50 is illustrated. The client 50 may include an uploading/downloading module 500 and a URL requesting module 501. The uploading/downloading module 500 may be configured to transmit and receive data to and from the network. The URL requesting module 501 receives a URL request input by a user, and sends the URL request to the network to search for network content corresponding to the URL request. Generally, functions of each of the uploading/downloading module 500 and the URL requesting module 501 may be implemented by such a software application as network browser, including such well-known browser software as Internet Explorer, Mozilla Firefox, Opera, and Safari. Alternatively, functions of either the uploading/downloading module 500 or the URL requesting module 501 may be implemented by different software applications. For example, an FTP application program may implement functions of the uploading/downloading module 500, whereas a network browser may execute a URL request.

It should be noted that the client 50 further includes a cache module 502, where the cache module 502 is configured to cache network content that has been accessed by the client 50 and security states thereof. When the client 50 accesses the network content again, a network browser firstly searches in the cache module 502; if the network content to be accessed and the security state thereof have been stored in the cache module 502, it is unnecessary for the client to download from the network, and the client can directly acquire the network content and the security state thereof from the cache module 502. In this way, the speed of accessing the network content is improved.

The client 50 further includes a judging module 503, where the judging module 503 is configured to judge whether the network content to which the uploading/downloading module 500 and/or the URL requesting module 501 requests access is secure. Specifically, the judging module 503 queries, from the cache module 502, the security state of the network content to be accessed, and judges, according to a query result, whether the requested network content is secure when the cache module 502 stores the security state of the network content to be accessed; and queries, from a categorized URL database 510 (which is described in detail hereinafter) in the security detection server 51, the security state of the network content to be accessed when the cache module 502 does not store the security state of the network content to be accessed, and judges, according to a query result, whether the network content to be accessed is secure.

The client 50 further includes a decision making module 505, configured to determine, according to a judgment result of the judging module 503, whether to allow the client 50 continues executing the access request initiated by the uploading/downloading module 500 and/or the URL requesting module 501.

The client 50 further includes a feedback module 505, configured to feed back the security state of the network content corresponding to the URL accessed by the uploading/downloading module 500 and/or the URL requesting module 501.

The client 50 further includes a display module 506, configured to display the judgment result of the judging module 503 to a user.

Figure 9:
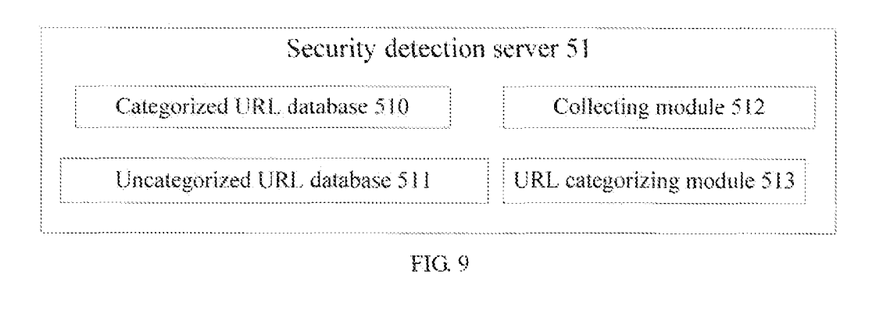
FIG. 9 is a structural block diagram of a security detection server according to an embodiment of the present disclosure.

The client 50 communicates with the security detection server 51. The security detection server 51 is configured to analyze network content that is uploaded or downloaded by the client 50, and determine and categorize possible impacts cased by the network content to the client 50. Referring to FIG. 9, a detailed structural example of the security detection server is illustrated. The security detection server 51 may be in two-way communication with the client 50, and receives file upload, file download, URL requests and comment feedback from the client 50. In addition, the security detection server may be also in two-way communication with the network. During specific implementation, the security detection server 51 may be integrated with firewall hardware or software for protecting the client 50 from unauthorized or malicious attacks over the network.

The security detection server 51 includes: a categorized URL database 510, configured to store URLs and security states thereof, where the security state is a quantified attribute indicating whether the network content corresponding to the URL is secure, so as to assist the client 50 to determine whether its initiated URL request is allowed and complete. The categorized URL database 510 may be specifically a relationship database, a planar file, or an object-oriented database.

During specific implementation, URL fields in the categorized URL database 510 are index coded such that information in the categorized URL database 510 may be quickly searched in real time. When URL lists in the categorized database 510 relates several millions of or even more URLs, it is beneficial to index code the URL lists to quickly searches for a target URL among the URL lists.

Figure 10:
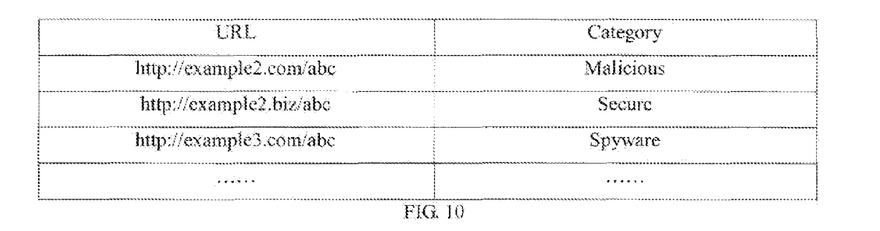
FIG. 10 exemplarily illustrates a categorized URL database according to an embodiment of the present disclosure.

Referring to FIG. 10, an example of a categorized URL database is illustrated. The database includes URL columns for storing categorized URL strings, and further includes category columns for storing a security state of data associated with the corresponding URLs.

Figure 11:
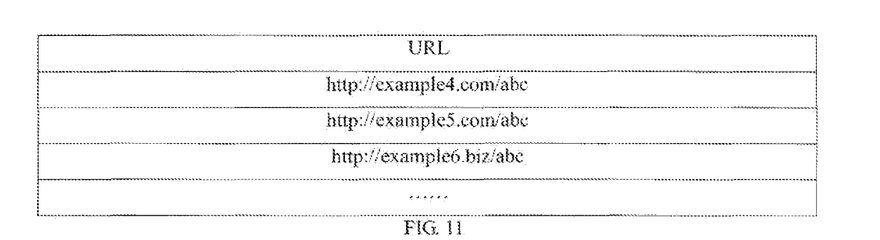
FIG. 11 exemplarily illustrates an uncategorized URL database according to an embodiment of the present disclosure.

The security detection server 51 further includes an uncategorized URL database 511, configured to store URLs that are from the client 50 and are not stored in the categorized URL database 510. Referring to FIG. 11, an example of an uncategorized URL database is illustrated.

The security detection server 51 further includes: a collecting module 512. The collecting module 512 may be specifically a software program, routine program, or process configured to collect network content corresponding to the URL. When the security detection server 51 receives a URL request from an uploading/downloading module 200 and/or a URL requesting module 501 in the client 50, the collecting module 512 may access by means of configuration the URL and download page data to a URL categorizing module 513 for the URL categorizing module 513 to analyze and categorize the data.

The URL categorizing module 513 is configured to categorize the uncategorized URLs received from the client 50, and specifically includes: a searching unit, a receiving unit, a virus library matching and searching unit, and a categorizing unit.

The searching unit is configured to search for URL page source data and scan the URL page source date to search in the page source data for a specific keyword indicative of the type of the network content.

For example, if the URL page source data acquired by scanning includes "javascript://", the URL page may be identified as using Java scripts. Although the content is not inherently insecure, there is a high probability that a webpage using Java scripts contains malicious content.

The receiving unit is configured to receive a security state of network content corresponding to a URL from the client 50.

The virus library matching and searching unit is configured to match the URL page data with a virus feature in an installed virus library.

For example, the URL page data may be matched with a domain associated with a known malicious IP address by comparison.

The categorizing unit is configured to gather information acquired by the searching unit and/or the receiving unit and/or the virus library matching and searching unit, categorize security states of the URLs according to the gathered information, and store the categorized security states of the URLs into a categorized URL database 510.

It should be noted that the security detection server 51 further includes a recording and storing module 515, configured to record detailed information of a request initiated by the client to a specific URL. Specifically, each event regarding request of the uncategorized URLs by the client 50 is recorded, or the frequency at which the client 50 requests the uncategorized URLs is recorded. The information in the recording and storing module 515 may be used to determine whether the uncategorized URLs have specific importance or priorities.

It should be noted that the recording and storing module 515 may further record requests for categorized URLs. Correspondingly, the security detection server 512 further include a modifying module 515, configured to modify security states of the categorized URLs according to the recorded information of the categorized URLs, to prevent the URLs from being assigned incorrect security states.

The above-described security detection server 51 is the same as the security detection server described in Embodiments 2 and 3.

With the system according to the embodiments of the present disclosure, prior to requesting a URL, the client acquires, by using the categorized URL database stored in the security detection server or a URL security state module, whether the requested URL is secure, so as to determine whether to continue requesting the URL. This ensures security of the client.

All or part of the steps disclosed in the technical solutions according to the embodiments can be implemented by software programming. The programs may be stored in a non-transitory computer-readable storage medium and may be executed by at least one processor. The storage medium includes various mediums capable of storing program code, such as a read only memory (ROM), random access memory (RAM), a magnetic disk, or a compact disc-read only memory (CD-ROM).

Described above are merely preferred embodiments of the present disclosure, but are not intended to limit the present disclosure. Any modification, equivalent replacement, or improvement made without departing from the principle of the present disclosure should fall within the protection scope of the present disclosure.

What is claimed is:

1. A network security identification method, comprising:
   prior to accessing network content corresponding to a uniform resource locator, judging, by a client, whether a cache stores a security state of the uniform resource locator;
   if the cache stores the security state of the uniform resource locator, acquiring, by the client, the security state of the uniform resource locator from the cache;
   if the cache does not store the security state of the uniform resource locator, sending, by the client, a request for accessing the network content corresponding to the uniform resource locator to a security detection server;
   receiving at the security detection server the request for accessing network content corresponding to the uniform resource locator;
   searching in the database by the security detection server, and judging whether a security state of the uniform resource locator exists in the database;
   when the security state of the uniform resource locator does not exist in the database, collecting by the security detection server data related to the uniform resource locator, and determining the security state of the uniform resource locator according to the collected data;
   subsequently returning by the security detection server the security state of the uniform resource locator to the client;
   receiving by the client the security state of the uniform resource locator returned by the security detection server;
   determining, by the client according to the security state of the uniform resource locator, whether to access the network content corresponding to the uniform resource locator; and
   upon accessing the network content corresponding to the uniform resource locator, determining, by the client, the security state of the uniform resource locator, and feeding back the security state of the uniform resource locator to the security detection server, such that the security detection server determines a final security state of the uniform resource locator according to the security state fed back by the client.

2. The method according to claim 1, wherein the determining, by the client according to the security state of the uniform resource locator, whether to access the network content corresponding to the uniform resource locator comprises:
   judging, by the client according to the security state of the uniform resource locator, whether the uniform resource locator is secure;
   if secure, continuing an operation of accessing the network content corresponding to the uniform resource locator;
   if insecure, judging whether the uniform resource locator is for webpage access or resource download;
   in case of webpage access, displaying security prompt information in a predetermined region on a page; and
   in case of resource download, displaying security prompt information for resource download, waiting to receive indication information indicating whether a user continues downloading resources, and downloading the resources and displaying the prompt information upon receiving the indication information input by the user for continuing downloading the resources.

3. A client and security detection server, comprising:
   in the client, one or more processors; and
   a non-transitory computer-readable storage medium storing one or more programs for execution by the one or more processors, the one or more programs including instructions for:
   prior to accessing network content corresponding to a uniform resource locator, judging whether a cache stores a security state of the uniform resource locator;
   if the cache stores the security state of the uniform resource locator, acquiring the security state of the uniform resource locator from the cache;
   if the cache does not store the security state of the uniform resource locator, sending a request for accessing the network content corresponding to the uniform resource locator to a security detection server;
   in the security detection server, one or more processors; and
   a non-transitory computer-readable storage medium storing one or more programs for execution by the one or more processors, the one or more programs including instructions for:
   receiving from the client the request for accessing network content corresponding to the uniform resource locator;
   searching in the database, and judging whether a security state of the uniform resource locator exists in the database;
   when the security state of the uniform resource locator does not exist in the database, collecting data related to the uniform resource locator, and determining the security state of the uniform resource locator according to the collected data; and
   subsequently return the security state of the uniform resource locator to the client; and
   in the client:
   receiving the security state of the uniform resource locator returned by the security detection server; and
   determining, according to the security state of the uniform resource locator, whether to access the network content corresponding to the uniform resource locator;
   wherein the one or more programs including instructions for:
   in the client, upon accessing the network content corresponding to the uniform resource locator, determining the security state of the uniform resource locator, and feeding back the security state of the uniform resource locator to the security detection server, such that the security detection server determines a final security state of the uniform resource locator according to the security state fed back by the client.

4. The client according to claim 3, wherein the one or more programs including instructions for:
   judging, according to the security state of the uniform resource locator, whether the uniform resource locator is secure;
   continuing an operation of accessing the network content corresponding to the uniform resource locator if the uniform resource locator is secure;
   judging whether the uniform resource locator is for webpage access or resource download if the uniform resource locator is insecure;
   displaying security prompt information on a predetermined region on a page if the uniform resource locator is for webpage access; and
   if the uniform resource locator is for resource download, displaying security prompt information for resource download, waiting to receive indication information indicating whether a user continues downloading resources, and downloading the resources and displaying the prompt information upon receiving the indication information input by the user for continuing downloading the resources.

5. A network security identification system, comprising: a client and a security detection server; wherein
- the client comprising one or more processors; and a non-transitory computer-readable storage medium storing one or more programs for execution by the one or more processors, the one or more programs including instructions for: prior to accessing network content corresponding to a uniform resource locator, judge whether a cache stores a security state of the uniform resource locator; acquire the security state of the uniform resource locator from the cache if the cache stores the security state of the uniform resource locator; and send a request for accessing the network content corresponding to the uniform resource locator to a security detection server if the cache does not store the security state of the uniform resource locator;
- the security detection server comprising one or more processors; and a non-transitory computer-readable storage medium storing one or more programs for execution by the one or more processors, the one or more programs including instructions for: receive from a client a request for accessing network content corresponding to a uniform resource locator; search in the database, and judge whether a security state of the uniform resource locator exists in the database; when the security state of the uniform, resource locator does not exist in the database, collect data related to the uniform resource locator, and determine the security state of the uniform resource locator according to the collected data; and subsequently return the security state of the uniform resource locator to the client; and
- the one or more programs on the storage medium of the client including instructions for: receiving the security state of the uniform resource locator returned by the security detection server, and determining, according to the security state of the uniform resource locator, whether to access the network content corresponding to the uniform resource locator;
- the one or more programs on the storage medium of the client including instructions for: upon accessing the network content corresponding locator, determining the security state of the uniform resource locator and feeding back the security state of the uniform resource locator to the security detection server;
- the one or more programs on the storage medium of the security detection server including instructions for: determining a final security state of the uniform resource locator according to the security state fed back by the client.

* * * * *